May 31, 1949.  H. W. BATCHELLER  2,471,923
ELECTRIC CONNECTOR WITH SPRING WIRE
Filed May 29, 1948

INVENTOR
HUGH W. BATCHELLER
by Wright, Brown, Quimby + May
ATTYS

Patented May 31, 1949

2,471,923

UNITED STATES PATENT OFFICE 2,471,923

ELECTRIC CONNECTOR WITH SPRING WIRE

Hugh W. Batcheller, Newton Highlands, Mass., assignor to Ark-Les Switch Corporation, Watertown, Mass., a corporation of Massachusetts Application May 29, 1948, Serial No. 29,970

1 Claim. (Cl. 173—363)

This invention relates to electric connecters of the type consisting primarily of two members, one of which is adapted to receive and grip the other in such a manner as to provide tight interfacial contact between the members. In designing a connecter of this type, there are several desirable objectives to be sought in addition to a good interfacial contact with substantial pressure between the faces which are in contact. For example, in most cases durability is important, that is, the ability of the device to undergo a large number of connections and disconnections without undue deterioration. From the economic or commercial point of view, simplicity of parts, ease of manufacture and ease of assembling parts are desirable features.

According to the present invention, a connecter is provided in which the foregoing desirable objectives are realized to a satisfactory degree. This connecter comprises two complementary members which have a broad area of interfacial engagement, a separate spring element being provided to press the faces together. The spring member is simply shaped, is easily assembled with one of the members, and when so assembled remains securely in place but can readily be replaced. As the spring element is not primarily a current-carrying part, the shape and material for this element are selected with a view to its optimum performance as a spring element.

For a more complete understanding of the invention, reference may be had to the following description thereof and to the drawing, of which—

Figure 1:
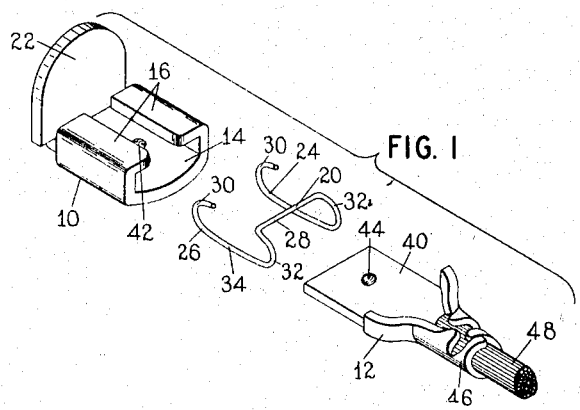
Figure 1 is a perspective view of the several parts of a connecter embodying the invention.

The connecter comprises two complementary members 10 and 12 adapted to be connected to complete an electrical circuit, or to be disconnected to interrupt such circuit. The member 10 includes a channel member 14 having inturned flanges 16 which overhang the bottom of the channel, and a spring element 20 which is normally assembled with but which is removable from the channel member. The channel member is made of heavy metal stock which is preferably of copper or brass, since it is a current-carrying member, and is sufficiently thick to be substantially rigid. The channel member 14 has an extension 22 integral therewith to which can be secured a terminal (not shown) to facilitate the connection of the member to a wire.

Figure 4:
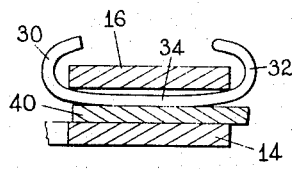
Figure 4 is a sectional view of the line 4—4 of Figure 2.

As shown in Figure 1, the extension 22 is bent up at right angles to the bottom of the channel 14, but it can extend out in the same plane if desired. The spring element 20 is preferably made of a single piece of spring wire of suitable size and material, the function of this element being to provide resilient pressure and not to carry electric current, although it may carry a little incidentally. The wire is bent into the shape of two open loops 24 and 26 connected by a transverse element 28. Each loop is adapted to engage on one of the flanges 16 and comprises end portions 30 and 32 adapted to hook over the respective ends of the flange, the end portions 30 and 32 being connected by a downwardly bowed portion 34 which underlies the flange and is convex downwardly toward the bottom of the channel 14, the lowermost point of the loop being substantially the mid-point thereof. When the spring element 20 is assembled with the channel 14, the bowed portion 34 of each loop touches the corresponding flange 16 at the ends thereof but at no other point, as indicated in Figure 4.

The connecter member 12, which is complemental to the member 10, comprises a tongue 40 which is adapted to enter the channel 14 with a sliding fit as to width. This tongue is adapted to engage under the bowed portions 34 of the spring member 20, the thickness of the tongue being somewhat greater than normal clearance between the portions 34 and the channel bottom 14. Hence, when the end of the tongue 40 is thrust into the channel 14, the bowed portions 34 are pushed upward and, to some extent, straightened. Being thus deformed by the tongue 40, they press resiliently downward against the tongue so as to hold it firmly against the bottom of the channel 14, thus ensuring a good electrical contact if the interfacial surfaces are clean.

Figure 3:
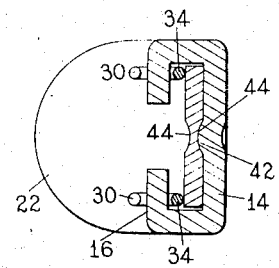
Figure 3 is a sectional view of the line 3—3 of Figure 2.

Preferably, the tongue 14 is provided with a low boss 42 on its longitudinal median, the tongue 40 being provided with a hole or a pair of complemental depressions 44 in both faces, as indicated in Figure 3, so as to receive the boss 42 and to hold the members 10 and 12 yieldingly against disconnection. Since the depressions 44 are provided in both faces of the tongue 40, the tongue can be inserted in the channel 14 with either of its faces up. The member 12 has a terminal portion 46 integral with the tongue 40. As shown, this terminal is of the kind adapted to receive the end of a wire 48 and to be soldered thereto, but any other type of terminal structure can be employed instead of the one shown.

Figure 2:
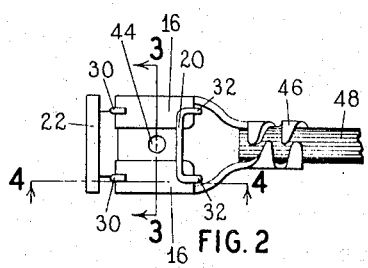
Figure 2 is a plan view of the connecter shown in Figure 1, assembled.

The member 10 can quickly and easily be assembled after the parts are shaped, as indicated in Figure 1. When being assembled, the end portions 30 of the spring element 20 are pinched together sufficiently to enable these portions to move into the channel between the edges of the flanges 16 until they reach the further ends of the flanges, whereupon they spring away from each other to engage over such further ends, the hook portions 32 of the loops then engaging the nearer ends of the flanges 16, as indicated in Figure 2. The spring element 20 thus holds itself in its proper assembled position with respect to the channel member, but can be removed by pinching the end portions 30 together again sufficiently to clear the edges of the flanges 16.

I claim:

A member of an electric connecter comprising a substantially rigid channel with a metallic bottom and inturned flanges overhanging said bottom, and a U-shaped piece of spring wire mounted on said channel with a portion extending longitudinally under each of said flanges, each said portion being downwardly bowed to be convex toward said bottom and bent up at its ends to engage the ends of the respective flanges whereby to maintain said spring element assembled with said channel.

HUGH W. BATCHELLER.

REFERENCES CITED

The following references are of record in the file of this patent:

UNITED STATES PATENTS

| Number | Name | Date |
|---|---|---|
| 1,531,816 | Russell | Mar. 31, 1925 |
| 1,864,989 | Maag-Eckenfelder | June 28, 1932 |
| 1,995,115 | Douglas | Mar. 19, 1935 |
| 2,061,961 | Culver et al. | Nov. 24, 1936 |

FOREIGN PATENTS

| Number | Country | Date |
|---|---|---|
| 43,465 | France | June 7, 1934 |
| (1st Addition to Number 711,998) | | |
| 539,811 | Great Britain | Sept. 24, 1941 |